March 16, 1965  N. A. ALTMANN ETAL  3,173,827
APPARATUS AND METHOD FOR PROCESSING WASTE PAPER PULP SLURRIES
Filed March 14, 1960  2 Sheets-Sheet 1
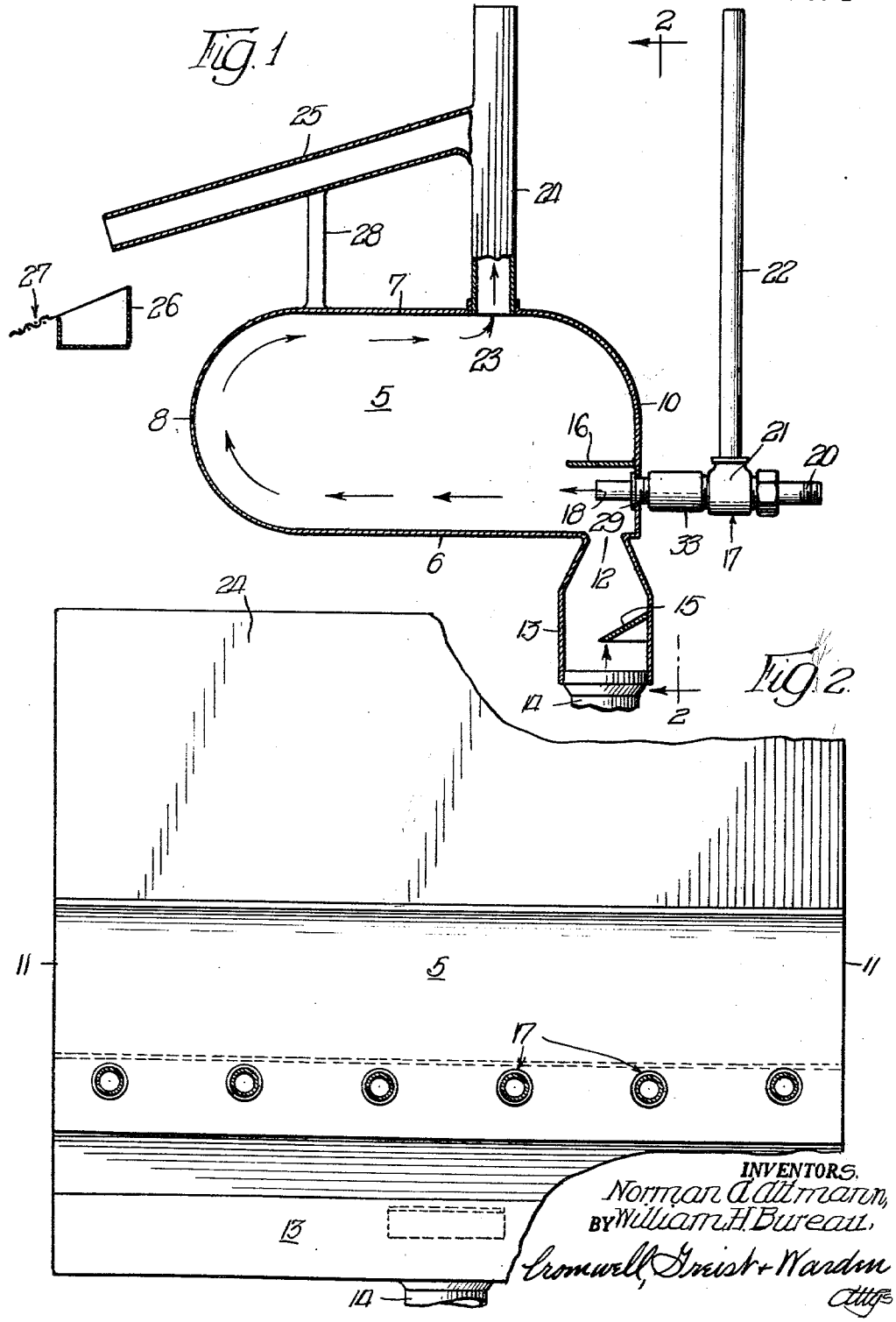
INVENTORS.
Norman A. Altmann,
BY William H. Bureau,
Cromwell, Greist & Warden
Attys

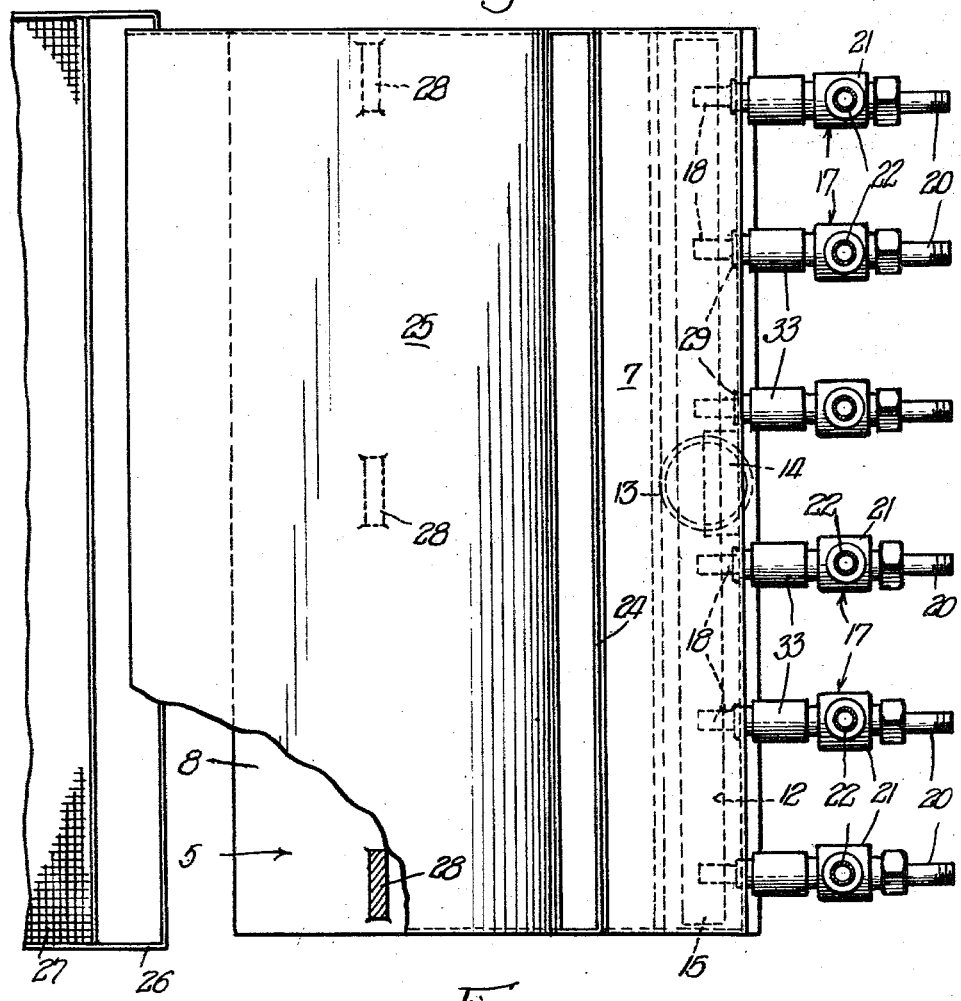
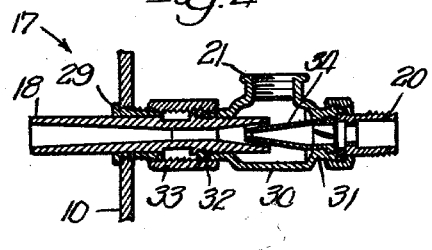

United States Patent Office 3,173,827
Patented Mar. 16, 1965

3,173,827
APPARATUS AND METHOD FOR PROCESSING WASTE PAPER PULP SLURRIES
Norman A. Altmann, Wilmette, and William H. Bureau, Glen Ellyn, Ill., assignors to Butler Company, Chicago, Ill., a corporation of Illinois
Filed Mar. 14, 1960, Ser. No. 14,847
6 Claims. (Cl. 162—4)

This invention relates to innovations and improvements in apparatus for, and method of, dispersing the fibers in a slurry of waste paper pulp and for stripping foreign particles therefrom, and dispersing such particles. This apparatus may be used as the submerged jet scrubbers in Altmann and Bureau Patent 2,916,412 in lieu of the scrubbers disclosed and described therein. The present apparatus also has other uses and applications in processing waste paper pulp and similar materials.

Slurries of waste paper pulp, such as those described in Patent 2,916,412, contain the fibers and substantial amounts of foreign particles including ink particles and particles of sizing and coating materials. Even though a waste paper pulp has been, for the most part, reduced to fibers and such particles, a ready separation of the particles from the fibers so as to permit reclaiming of the fibers in a clean condition is difficult and appears to depend upon obtaining an efficient and economical dispersion (and therefor separation) throughout the slurry of the fibers and particles. Once a thorough dispersion has been obtained, then it is easy to effect a separation between fibers and particles as by means of an inclined screen or so-called side hill washer.

In the jet scrubbers shown and described in Altmann and Bureau Patent 2,916,412 submerged, high velocity jets of wash water are used to obtain or effect dispersion in the refined waste paper pulp slurries of the fibers and foreign particles in an efficient manner. It has been discovered in accordance with the present invention that a more efficient, economical and generally superior dispersion and separation of fibers and foreign particles (i.e. coating, ink, sizing) can be obtained by proper use of combined water-air jets, water operated air jets being a preferred form.

Accordingly, the object of the present invention, generally stated, is the provision of new and improved apparatus for, and method of, efficiently and economically dispersing fibers in a slurry of waste paper pulp and stripping foreign particles therefrom and dispersing the same.

Certain other objects of the invention will, in part, be obvious, and will in part appear hereinafter.

For a more complete understanding of the nature and scope of the invention reference may now be had to the following detailed description thereof taken in connection with the accompanying drawings wherein:

FIG. 1 is a view in vertical section of a pulp scrubber or washer apparatus constituting one embodiment of the invention;

FIG. 2 is a side elevational view, broken away at the top and bottom, taken on line 2—2 of FIG. 1;

FIG. 3 is a top plan view of the apparatus shown in FIG. 1; and,

Fig. 4 is a longitudinal sectional view through one of the water-operated air jets used in the apparatus shown in FIG. 1.

Referring to the drawings, the apparatus shown therein comprises a processing chamber 5 comprising a bottom wall 6, top wall 7, front side wall 8, rear side wall 10, and end walls 11—11. The bottom wall 6 has an elongated slurry inlet opening 12 formed therein adjacent the bottom right hand corner of the chamber as viewed in FIG. 1. This opening 12 extends across the full width of the chamber. Depending down from the bottom 6 below the slurry inlet 12 is an elongated inlet chamber 13 provided at the bottom with a central inlet pipe connection 14. A stream of slurry may be introduced through the inlet opening 14 and in order to prevent this stream, which comes in at fairly high velocity, from shooting directly up through the central opening 12 without spreading out, a baffle 15 is provided projecting over the opening 14 from one side of the inlet chamber 13, as shown in FIGS. 1 and 2. By reason of the baffle 15 the inlet slurry is adequately deflected and distributed so that it enters through the elongated opening 12 more or less uniformly from end to end.

Above the slurry inlet opening 12 an elongated baffle plate 16 projects laterally from the side wall 10 on the interior of the chamber 5 so as to deflect the entering stream of slurry into the body of the chamber. A plurality (six shown) of water-operated air jets 17—17 are provided in the rear side wall 10 below the baffle 16. The internal structure of one of these jets 17 will be described in connection with FIG. 4. However, each jet 17 has a water-air jet discharge nozzle 18 which projects into the chamber 8 in a direction transverse to the elongated slurry opening 12, a water inlet connection 20 and an air suction inlet 21. In order to prevent water or slurry from discharging in event that the jets 17 are not in operation but the chamber 5 contains slurry, an air inlet pipe 22 stands up from each of the inlet openings 21.

In the top wall 7 there is an elongated discharge opening 23 which communicates with the bottom of an upstanding elongated riser column 24. This column is open at the top for discharge of air and has a downwardly inclined slurry outlet connection or spout 25 extending off from the front side thereof over the top of the chamber 5. This de-aerated slurry discharges from the spout 25 into a trough 26 at the upper end of a side hill, or inclined screen, washer 27 of known type. The elongated spout or discharge connection is supported in part by the column 24 and in part by uprights 28.

Referring now to FIG. 4 for description of one of the water operated air jets 17, each jet 17 comprises a T-shaped body 30 having a water inlet connection 31 coaxially aligned with a discharge connection 32, and having the air inlet or suction connection 21 extending at right angles as in a pipe T. Each of the jets 17 is connected to and supported from the rear side wall 10 by means of a coupling 33 each of which is screwed onto a nipple 29 suitably welded in an opneing provided therefor in the wall 10. The discharge connection 32 of each body 30 screws into one of these couplings 32. Each discharge connection 32 is threaded on the inside for receiving the inner end of the discharge nozzle 18 the inner passageway through which is Venturi-shaped.

Each water inlet 20 is coupled to the inlet connection 21 by means of the clamping nuts 31 and there is a water inlet nozzle 34 supported in each of the inlet connections 31 as shown with the tip end or discharge end of each nozzle 34 fitting into the inlet or the adjacent end of a Venturi discharge nozzle 18, as shown.

Water operated air jet nozzles of the foregoing type are commercially available in several known makes and they operate in known manners. They are sometimes referred to as water jet exhausters or water operated jet pumps and widely used for that purpose. One such device which may be used for the jets 17 is commercially available from Penberthy Manufacturing Company of Detroit, Michigan (Series 180A).

The operation of the apparatus will now be described with mention being made of typical operating conditions for purpose of illustration but not limitation. A slurry of waste paper which was coarsely pulped and then subjected to the refining action of a Baurer refiner so as to defiber the pulp and shatter and disperse the foreign particles of coating, sizing and ink from the fibers, is introduced into the inlet 14 at the rate of 180 gallons per minute at a consistency of 1%. Due to the combined deflection action of the baffle 16 and the air water jets, the slurry entering through the inlet opening 12 is deflected toward the front side wall 8 parallel to the bottom wall 6.

With wash water being supplied to each of the jets 17 at its connection 20 at a pressure of 150 pounds per square inch and a flow rate of 5.5 gallons per minute, each jet will draw in and discharge approximately 3.45 cubic feet of air per minute. The water and air issue as a combined, high velocity, discharge jet through the outer end of each nozzle 18. The combined air and water jets, being submerged in the slurry of container 5, project or penetrate all the way to the opposite or front side wall 8 and impart a very intense and efficient turbulence to the body of slurry filling the chamber 5. The arrows in FIG. 1 indicate the general flow pattern along the bottom wall 6 and up the curved side wall 8.

The processed slurry discharges through outlet opening 23 at the rate equal to the combined inlet flow through the connection 14 and the sum of all the wash water introduced through each of the jets 17. The addition of the wash water dilutes the slurry and lowers its consistency. As the discharged slurry flows up through the riser 24 the air readily separates from the slurry and comes off at the open upper end of the riser 24 while the washed or processed slurry discharges through the side connection 25.

The apparatus shown in the drawings shows the parts in the correct proportions and typically the chamber 5 may be 36 inches long, 10 inches high, and 20 inches wide.

Unexpectedly, the air causes no undesirable foaming or interference with the flow of stock from the apparatus. The dispersion and separation of fiber from fiber, and foreign particles from each other from the fibers, is made much more efficient and complete. The difference in action and effectiveness with and without air may be readily determined. Using a glass chamber it can be clearly observed that with air being introduced with the water, the jets reach the opposite wall and the whole chamber contents are undergoing turbulence with the air inlets shut off, the submerged jets extend only part-way across the chamber and the turbulence within the chamber is greatly reduced.

Comparative tests have been made in which the apparatus was operated in the normal manner except that the air intake connections to the jets 17 were closed so that only water was introduced as submerged jets into the chamber 5. The screened pulp was then tested for brightness and it was found that on operating in the absence of air to the jets the brightness fell from 1 to 3 points, a significant amount.

Certain changes in operation may be made without modifying the apparatus. Instead of relying on the jet effect of the water to draw in the air in the jets 17, the air may be introduced under pressure as from a compressed air line. When this is done it is possible to reduce the water pressure. Since the jets 17 have no minute orifices to become clogged, instead of delivering wash water to the jets 17, a small portion of the slurry itself may be delivered under pressure to the jets.

While the pulp scrubbing and stripping apparatus of this invention has particular utility for conditioning or processing slurries of reclaimed or waste paper pulp, it can also be used to advantage for processing new pulp such as chemical or semi-chemical pulp. Often such pulp contains particles of bark or other debris and requires washing and can be effectively conditioned for washing with the apparatus of this invention.

It will be understood that certain other changes may be made in the embodiments of the invention described above in connection with the accompanying drawings without departing from the spirit and scope of the invention. Accordingly, the foregoing disclosure is intended to be interpreted as illustrative and not in a limiting sense.

What is claimed as new is:

1. Apparatus for dispersing fibers in a slurry of wastepaper pulp and for stripping foreign particles from the fibers and dispersing such particles whereby to condition the slurry for subsequent separation of said fibers and particles, which comprises, a processing chamber, said chamber having an elongated slurry inlet whereby an elongated flow stream of slurry may be introduced therein, a plurality of water-air jets having separate inlet connections for water and air mounted on the outside of said chamber with their discharge nozzles projecting into said chamber so as to strike and traverse said entering elongated flow stream of slurry, a riser column projecting from the top of said chamber, and said riser column having a slurry discharge outlet projecting laterally therefrom.

2. Apparatus for dispersing the fibers in a slurry of wastepaper pulp and for stripping foreign particles from the fibers and dispersing such particles, which comprises, a chamber having top and bottom walls, front and rear side walls, and end walls, said bottom wall having an elongated slurry inlet adjacent one side wall, a plurality of water-operated air jets having separate inlet connections for water and air disposed along said one side wall with their water-air discharge nozzles projecting into said chamber above and adjacent to said slurry inlet transversely thereto, said top wall having an elongated slurry outlet opening, an elongated riser column projecting from the top wall of said chamber in communication with said outlet opening, and said riser column having an elongated slurry discharge outlet laterally projecting therefrom below the upper end thereof.

3. Apparatus for conditioning wastepaper pulp for separation of the fibers from associated particles such as of ink, coating and sizing, comprising, an elongated chamber having top, bottom, side and end walls, said bottom wall having an elongated slurry inlet opening adjacent one side wall, said bottom wall having an elongated slurry inlet depending therefrom and communicating with said slurry inlet opening, a plurality of water-operated air jets having separate inlet connections for water and air mounted in said one side wall with their discharge nozzles projecting into said chamber transversely to said elongated slurry inlet opening and adjacent thereto, an elongated baffle projecting inwardly from said one side wall over said slurry inlet opening and over said jet nozzles, said top wall having an elongated slurry outlet opening extending parallel to said slurry inlet opening, an elongated riser column extending upwardly from said slurry outlet opening, and an elongated slurry discharge spout projecting laterally from the side of said riser column.

4. The apparatus of claim 3 wherein the top and bottom walls of said chamber are generally flat and the side wall opposite the one having said jet is outwardly curved.

5. The apparatus of claim 3 wherein said elongated slurry inlet has an upwardly discharging pipe connection in the middle bottom thereof, and a deflecting baffle plate is disposed above said pipe connection to deflect the entering slurry stream in opposite directions.

6. The continuous method of conditioning a slurry of wastepaper pulp which has undergone refining action to defiber the wastepaper and dislodge foreign particles therefrom, which comprises, introducing a stream of a slurry of refined wastepaper pulp into a processing chamber and subjecting the body of slurry in said chamber to the turbulence creating action of a plurality of high velocity submerged jets of water and air so as to disperse said fibers and foreign particles in the slurry, and continuously discharging a stream of the processed slurry from said chamber.

References Cited in the file of this patent

UNITED STATES PATENTS

| | | |
|---|---|---|
| 1,482,488 | Sisson | Feb. 5, 1924 |
| 2,603,460 | Kalinske | July 15, 1952 |
| 2,795,402 | Mead | June 11, 1957 |
| 2,916,216 | Altmann | Dec. 8, 1959 |
| 2,916,412 | Altmann | Dec. 8, 1959 |

FOREIGN PATENTS

| | | |
|---|---|---|
| 368,089 | Italy | Feb. 8, 1939 |